US012444834B2

(12) United States Patent
Hatakeyama et al.

(10) Patent No.: US 12,444,834 B2
(45) Date of Patent: Oct. 14, 2025

(54) ANTENNA ATTACHMENT AND ANTENNA DEVICE

(71) Applicants: Yutaka Hatakeyama, Katagami (JP); Ryutaro Miura, Katagami (JP); Satoshi Sato, Katagami (JP); Hisashi Takizawa, Katagami (JP); Yoshifumi Kishiue, Katagami (JP); Shinobu Wakahara, Toyota (JP); Takuto Nakamura, Kasugai (JP)

(72) Inventors: Yutaka Hatakeyama, Katagami (JP); Ryutaro Miura, Katagami (JP); Satoshi Sato, Katagami (JP); Hisashi Takizawa, Katagami (JP); Yoshifumi Kishiue, Katagami (JP); Shinobu Wakahara, Toyota (JP); Takuto Nakamura, Kasugai (JP)

(73) Assignees: MITSUMI ELECTRIC CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 18/308,729

(22) Filed: Apr. 28, 2023

(65) Prior Publication Data

US 2024/0021978 A1 Jan. 18, 2024

(30) Foreign Application Priority Data

Apr. 28, 2022 (JP) ................................ 2022-074024

(51) Int. Cl.
*H01Q 1/32* (2006.01)
*H01Q 9/04* (2006.01)

(52) U.S. Cl.
CPC ......... *H01Q 1/3275* (2013.01); *H01Q 9/0407* (2013.01)

(58) Field of Classification Search
CPC ... H01Q 1/1214; H01Q 1/3275; H01Q 9/0407
See application file for complete search history.

(56) References Cited

U.S. PATENT DOCUMENTS 5,101,213 A * 3/1992 Harada .................. H01Q 1/088 343/900
5,325,104 A * 6/1994 Harada ................ H01Q 1/1214 343/715

(Continued)

FOREIGN PATENT DOCUMENTS

JP 4214399 B 1/2009

*Primary Examiner* — Thien M Le
(74) *Attorney, Agent, or Firm* — Shih IP Law Group, PLLC

(57) ABSTRACT

An antenna attachment including: a male screw part to be screwed with an antenna main body of an antenna device to be installed on a moving body, the male screw part including a head portion, a thread portion, and an intermediate portion between the head portion and the thread portion having a cross section smaller than the head portion and the thread portion; and a washer including a hole portion allowing passage of part of the male screw part. The hole portion has a shape in which a first hole and a second hole having different sizes are overlapped. The first hole has a shape not allowing passage of the head portion and the thread portion and allowing passage of the intermediate portion. The second hole has a shape not allowing passage of the head portion and allowing passage of the thread portion and the intermediate portion.

7 Claims, 5 Drawing Sheets

(56) References Cited

U.S. PATENT DOCUMENTS

| | | | | |
|---|---|---|---|---|
| 8,622,311 | B2 * | 1/2014 | Hamedani | G06K 19/07771 235/492 |
| 9,072,771 | B1 * | 7/2015 | Goetz | H01Q 1/1214 |
| 9,414,654 | B2 * | 8/2016 | Gustafsson | G07D 5/00 |
| 2005/0074281 | A1 * | 4/2005 | Noro | H01Q 1/1214 403/408.1 |
| 2009/0029741 | A1 * | 1/2009 | Satou | H01Q 9/0407 455/566 |
| 2011/0226927 | A1 * | 9/2011 | Sato | H01Q 1/3275 248/534 |
| 2018/0261912 | A1 * | 9/2018 | Mizuno | H01Q 1/32 |
| 2024/0162596 | A1 * | 5/2024 | Oishi | H01Q 1/22 |

* cited by examiner

ANTENNA ATTACHMENT AND ANTENNA DEVICE

REFERENCE TO RELATED APPLICATIONS

This application is based upon and claims the benefit of priority from the prior Japanese Patent Application No. 2022-074024, filed on Apr. 28, 2022, the entire contents of which are incorporated herein by reference.

TECHNICAL FIELD

The present invention relates to an antenna attachment and an antenna device.

DESCRIPTION OF RELATED ART

A conventionally known antenna device as an on-board antenna device to be installed on a roof of a vehicle such as an automobile has a mechanism to be attached to the roof using an antenna attachment including a male screw (bolt). More specifically, a male screw part of the antenna attachment is screwed with a female screw of an antenna base of the antenna device by a predetermined amount for temporary fastening. The antenna attachment is inserted into a fixing opening in the roof, and the male screw part is retightened, thereby fixing and attaching the antenna device to the roof with the roof being sandwiched between the antenna attachment and the base.

For example, a fixing structure known as an antenna attachment includes a fixing metal fitting having a through-hole and a male screw to be inserted into the through-hole (see Japanese Patent No. 4214399). The through-hole of the fixing structure is provided with two opposite protrusions (claw portions) on the inner periphery (FIG. 4(*b*) of Japanese Patent No. 4214399), and the protrusions catch threads of the male screw to achieve a countermeasure for preventing the male screw from falling out of the fixing metal fitting.

In a configuration considered as another countermeasure for preventing a male screw from falling out of a fixing metal fitting, gear-like three or more protrusions are provided on the inner periphery of a through-hole in addition to the fixing structure of Japanese Patent No. 4214399, and the male screw is screwed with the plurality of protrusions to be emplaced at the fixing metal fitting. However, the fixing structure of Japanese Patent No. 4214399 and the above-described configuration of gear-like protrusions might cause a contradiction to falling-out of the male screw, such as occurrence of oblique catching in which an axial direction of the male screw becomes oblique with respect to the plane of the through-hole so that the male screw bites. Therefore, the degree of improvement is small in terms of emplacement properties (operability).

When commonly attaching an antenna device to a vehicle, a temporary fastening component made of resin is separately emplaced at the antenna attachment so as to prevent the antenna device from being detached from the vehicle. Neither the fixing structure of Japanese Patent No. 4214399 nor the above-described configuration of gear-like protrusions has a temporary fastening component, and it is considered to provide the antenna attachment with a temporary fastening function.

More specifically, the temporary fastening function is provided by applying a screw locking agent (a screw loose stopping agent) to the threads of the male screw in order to define the height of the male screw at the time of temporary fastening and configuring the male screw not to be screwed unless torque of a certain value or more is applied. The screw locking agent is a solution of resin such as nylon that fixes a tightening portion such that the screw is not loosened, and solidifies after being applied to the threads.

However, in the conventional fixing structure having the above-described temporary fastening function, the screw locking agent applied to the male screw might be scratched by the protrusions of the through-hole to come off.

SUMMARY OF THE INVENTION

The present invention has an object to improve operability in a step of assembling an antenna attachment.

To achieve the above-described object, according to an aspect of the present invention, there is provided an antenna attachment including: a male screw part to be screwed with an antenna main body of an antenna device to be installed on a moving body, the male screw part including a head portion and a thread portion, and an intermediate portion that is provided between the head portion and the thread portion and has a cross section smaller than cross sections of the head portion and the thread portion; and a washer including a hole portion that allows passage of part of the male screw part. The hole portion has a shape in which a first hole and a second hole having sizes different from each other are overlapped. The first hole has a shape that does not allow passage of the head portion and the thread portion and allows passage of the intermediate portion. The second hole has a shape that does not allow passage of the head portion and allows passage of the thread portion and the intermediate portion.

According to an aspect of the present invention, the operability in the step of assembling the antenna attachment is improved.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter, an embodiment according to the present invention will be described in detail with reference to the accompanied drawings. However, the scope of the invention is not limited to the illustrated examples.

Figure 1:
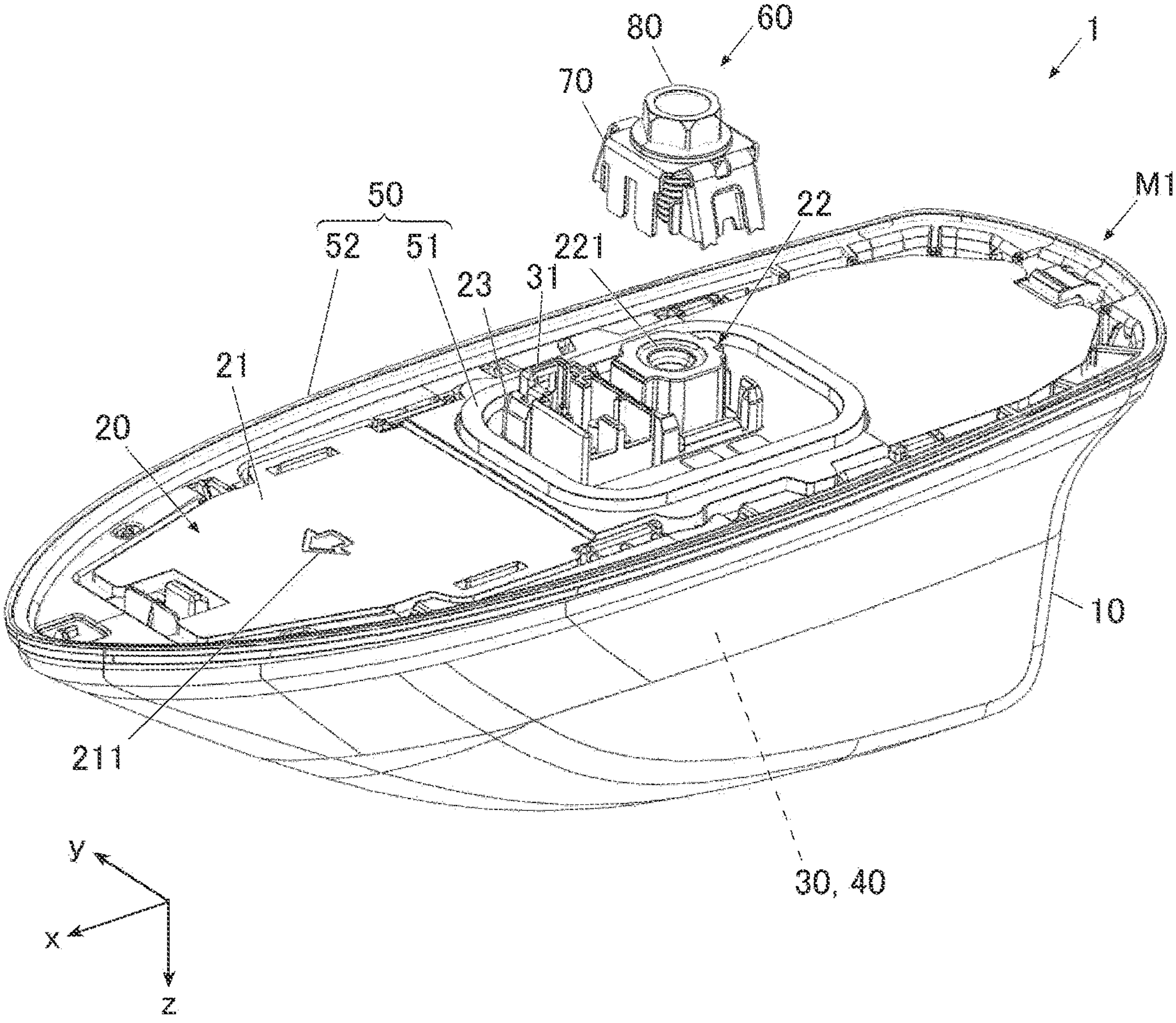
FIG. 1 is an exploded perspective view separately showing an antenna attachment and an antenna main body of an antenna device of an embodiment of the present invention before temporary fastening.
Figure 2:
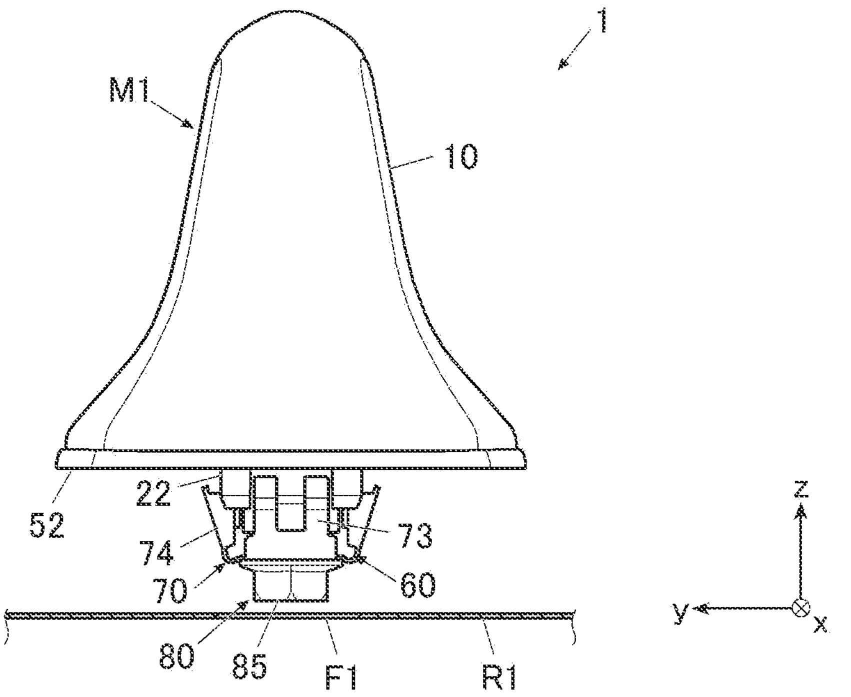
FIG. 2 is a side view of the antenna device after temporary fastening of the antenna attachment and before passage through a fixing opening.
Figure 3:
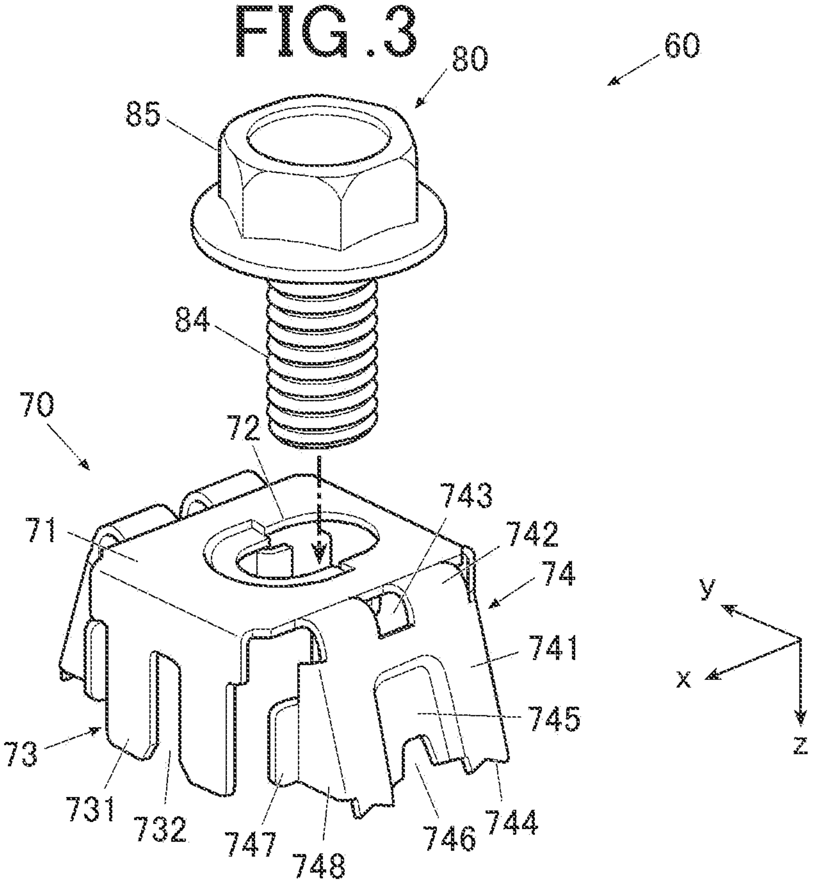
FIG. 3 is a perspective view of the antenna attachment.
Figure 4:
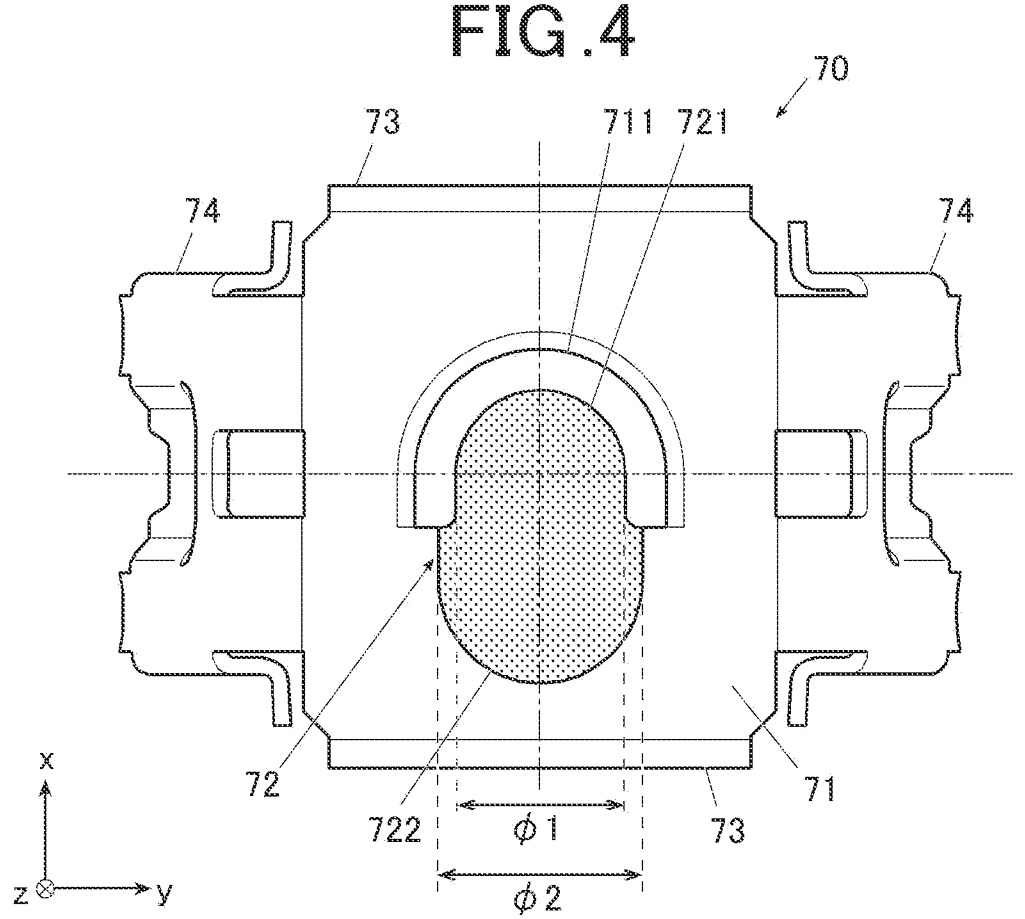
FIG. 4 is a top view of a legged washer.
Figure 5:
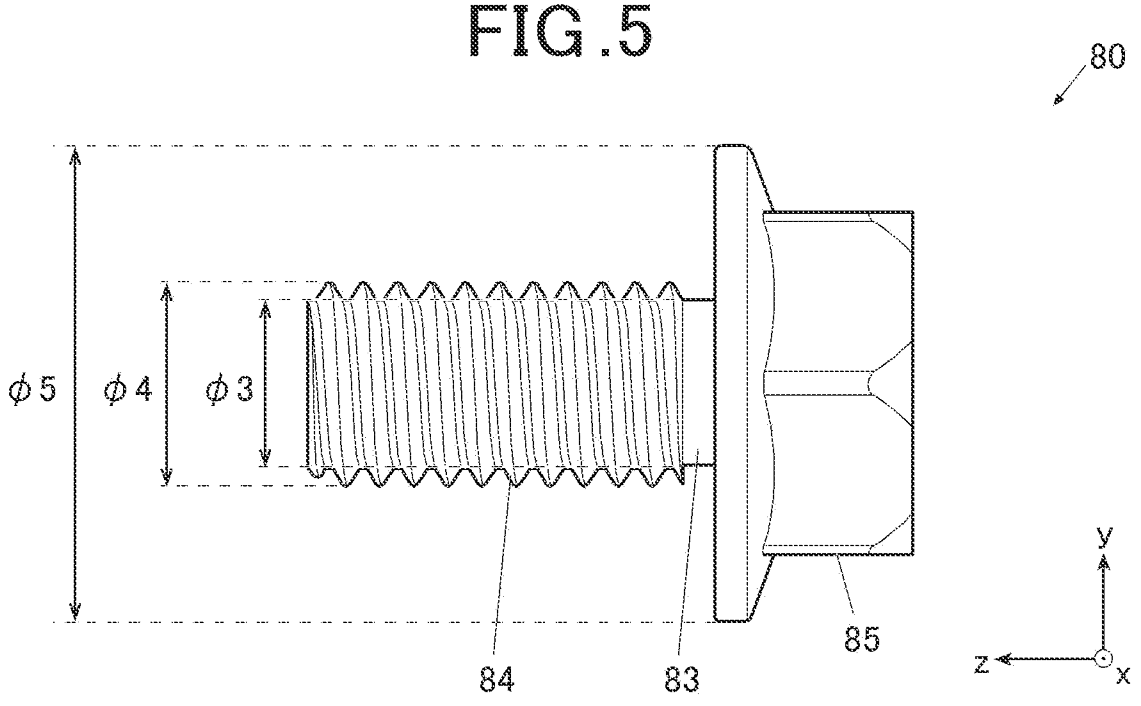
FIG. 5 is a side view of a male screw part.

An antenna device 1 of an embodiment according to the present invention will be described with reference to FIG. 1 to FIG. 7C. A device configuration of the antenna device 1 will be described first with reference to FIG. 1 to FIG. 5. FIG. 1 is an exploded perspective view separately showing an antenna attachment 60 and an antenna main body M1 of the antenna device 1 of the present embodiment before temporary fastening. FIG. 2 is a side view of the antenna device 1 after temporary fastening of the antenna attachment 60 and before passage through a fixing opening F1. FIG. 3 is a perspective view of the antenna attachment 60. FIG. 4 is a top view of a legged washer 70. FIG. 5 is a side view of a male screw part 80.

As shown in FIG. 1, the antenna device 1 of the present embodiment is an on-board antenna device of what is called a shark fin antenna to be attached to the fixing opening F1 (FIG. 2) in an installation surface of a roof R1 (FIG. 2) of a vehicle such as an automobile.

The antenna device 1 is an antenna device internally including an antenna part (not shown) that receives a GNSS signal from a global navigation satellite system (GNSS) satellite, for example. However, the antenna part included in the antenna device 1 is not limited to this. The antenna device 1 may be an antenna device including an antenna part that performs communication such as AM radio broadcasting (frequency band: MW (LW) band)/FM radio broadcasting (frequency band: VHF band), cellular communication (such as long term evolution (LTE)), digital radio broadcasting, or satellite radio (such as Sirius XM (SXM)), or may be a composite antenna device including a plurality of antenna parts for a plurality of communication systems.

As shown in FIG. 1, the antenna device 1 includes the antenna main body M1 and the antenna attachment 60. The antenna main body M1 includes an antenna cover 10, an antenna base 20, and a pad part 50. The antenna attachment 60 has the legged washer 70 as a washer and a male screw part 80. The antenna main body M1 further includes a substrate part 30 and an antenna part 40 in a space formed between the antenna cover 10 and the antenna base 20.

As will be described later, the antenna device 1 is attached to the fixing opening F1 after a state (FIG. 1) of the antenna main body M1 in which the antenna cover 10, the antenna base 20, the substrate part 30, the antenna part 40, and the pad part 50 have been assembled transitions to a temporarily fastened state (FIG. 2) in which the antenna attachment 60 is fastened temporarily to the antenna base 20. In FIG. 1, FIG. 2, and subsequent drawings, three-dimensional x-axis (axis in the front-rear direction of the vehicle), y-axis (axis in the lateral direction of the vehicle), and z-axis (axis in the height direction) are taken with reference to the vehicle to which the antenna device 1 has been attached.

The antenna cover 10 is an outer case attached to the antenna base 20, formed to be raised into a streamline shape from the front side (the +x direction) to the rear side (the −x direction), and formed into a low-profile shark fin shape so as not to degrade the appearance of the vehicle. The antenna cover 10 is a molded product made of a synthetic resin or the like having radio wave transmissivity and insulation properties, such as acrylonitrile butadiene styrene (ABS) resin, and having an opened lower surface. An opening in the lower surface of the antenna cover 10 is designed such that a space for storing the substrate part 30, the antenna part 40, and the like is formed when the antenna base 20 and the like are attached thereto.

The antenna base 20 is a basic part of the antenna device 1, and has a structure to support the substrate part 30 and to be attached to the fixing opening F1 in the installation surface of the vehicle. The antenna base 20 is an antenna base formed of a die cast metal such as aluminum or zinc, and has a flat plate portion 21, a screw hole portion 22, and a connector hole portion 23.

The flat plate portion 21 is a substantially flat plate-shaped base. The flat plate portion 21 has a mark 211. The mark 211 is an arrow mark, and the arrow indicates the front side (the +x direction) of the vehicle as a direction of attaching the antenna device 1. The flat plate portion 21 may be formed of a sheet metal such as a steel plate. The connector hole portion 23 is a hole portion extending through in the z direction, through which a connector portion 31 which will be described later is to be inserted.

The screw hole portion 22 extends from the flat plate portion 21 in the −z direction (the earth's surface direction (an inner direction of the vehicle as seen from the outside of the fixing opening F1)) in a protruding manner, and the antenna attachment 60 is to be attached to the screw hole portion 22. The screw hole portion 22 has a female screw portion 221. The female screw portion 221 is threaded with female threads in +z axis direction, with which the male screw part 80 is to be screwed.

The substrate part 30 is a printed circuit board (PCB) having a plane arranged on a horizontal plane (the x-y plane), for example, and the antenna part 40 and various circuit elements are mounted on the substrate part 30. The substrate part 30 has the connector portion 31. The connector portion 31 is a substrate mounted-type connector mounted on a substrate of the substrate part 30, and is a connector for connecting a signal received by the antenna part 40 to equipment in a cabin of the vehicle via a cable. The antenna part 40 is a patch antenna for GNSS communication, for example.

The pad part 50 is implemented by a packing made of an elastic body such as urethane foam, and has pads 51 and 52. The pad 51 is a waterproof pad provided to surround the screw hole portion 22 and the connector hole portion 23 of the flat plate portion 21. The pad 52 is a preliminary waterproof pad provided on the outer periphery of the flat plate portion 21. The pad 52 is arranged, sandwiched, and compressed between the antenna cover 10 and the installation surface of the roof R1, thereby achieving a primary waterproof/dustproof function. The pad 51 is arranged, sandwiched, and compressed between the antenna base 20 and the installation surface of the roof R1, thereby achieving a waterproof/dustproof function for water/dust having passed through the primary waterproof/dustproof function of the pad 52.

The legged washer 70 of the antenna attachment 60 is a washer formed of a sheet metal made of metal having spring properties, such as, for example, steel use stainless (SUS) (e.g., SUS 304 having high hardness), and having functions of allowing passage of the male screw part 80 and fixing the antenna attachment 60 to the antenna base 20 and the installation surface of the roof R1.

The male screw part 80 of the antenna attachment 60 is a bolt formed of SUS, for example, to be screwed with the female screw portion 221 of the screw hole portion 22.

As shown in FIG. 3 and FIG. 4, the legged washer 70 has a flat plate portion 71, a hole portion 72, fixed leg portions 73 as leg portions, and movable leg portions 74. As shown in FIG. 3 and FIG. 5, the male screw part 80 has a cylindrical portion 83 as an intermediate portion, a thread portion 84, and a head portion 85.

The flat plate portion 71 is a rectangular flat plate portion on the x-y plane as a base body of the legged washer 70, and has the hole portion 72 formed at a central portion of the plane. The flat plate portion 71 has a recess 711. The recess 711 is arranged around a hole 721 which will be described later of the hole portion 72 and provided to increase the strength of the hole 721 (the flat plate portion 71).

The hole portion 72 is a through-hole having a shape obtained by overlapping two large and small circles having different diameters, and has holes 721 and 722. The hole 721 is a circular hole which overlaps the hole 722 and is smaller than the hole 722, and has a central point arranged at a position to be a central point (an intersection of dashed-dotted central lines on FIG. 4) of the flat plate portion 71. The hole 722 is a circular hole which overlaps the hole 721 and is larger than the hole 721, and has a central point arranged at a position offset from the central point of the hole 721 in the −x direction.

The fixed leg portions 73 are two fixed leg portions oppositely connected to opposite ends of the flat plate portion 71 in the x-axis direction and extending in the +z direction. Each of the fixed leg portions 73 has two legs 731 and a slit 732. The leg 731 extends in the +z direction. The slit 732 is formed between the legs 731, extends in the z-axis direction, and is to be fitted over a protrusion (not shown) formed on the antenna base 20. The slit 732 fixed on the protrusion of the antenna base 20 prevents the legged washer 70 from rotating on the x-y plane around the male screw part 80 when the male screw part 80 is tightened.

The movable leg portions 74 are paired movable leg portions oppositely connected to the opposite ends of the flat plate portion 71 in the y-axis direction and extending in a synthetic direction of the +z direction and the +y direction or a synthetic direction of the +z direction and the −y direction. Each of the paired movable leg portions 74 has two legs 741, spring portions 742, a cutout 743, claw portions 744, a recess 745, a slit 746, protrusions 747, and connecting portions 748. The leg 741 extends in the synthetic direction of the +z direction and the +y direction or the synthetic direction of the +z direction and the −y direction and is movable in a rotation direction on a y-z plane around the spring portion 742 (so as to open or close with respect to the fixed leg portions 73).

The spring portions 742 are two plate spring portions connecting the flat plate portion 71 and the legs 741, and having spring properties. The cutout 743 is intended for adjusting the strength of the spring properties of the respective spring portions 742. The repelling force (resilience) of the spring portions 742 when deformed is smaller as the cutout 743 has a larger size. Thus, the size of the cutout 743 is set such that the strength of the spring properties of the spring portions 742 becomes appropriate.

The claw portions 744 are two claw portions, each of which is provided at the leading end of each of the legs 741. When the antenna device 1 is attached to the fixing opening F1 in the roof R1 of the vehicle, the claw portions 744 penetrate a coating on the surface of the roof R1 to come into contact with an inner metal portion in a digging manner. A ground potential of the antenna device 1 is taken from the metal portion of the roof R1 having the ground potential of the vehicle via the antenna attachment 60 including the claw portions 744.

The recess 745 is a rib provided to increase the strength of the legs 741. The slit 746 is provided at the leading end of the recess 745, and has a function of adjusting the height (the length in the +z direction) of the claw portions 744 with respect to the antenna base 20 (the roof R1). Two of the claw portions 744 are provided for each of the legs 741. The heights of all the claw portions 744 with respect to the antenna base 20 are identical as a design value, but are not identical in an actual component due to manufacturing variations. Although the presence of the recess 745 provides rigidity for the two legs 741 of each of the movable leg portions 74, providing the slit 746 enables each of the four claw portions 744 at the leading ends to have a certain degree of freedom (play), thus preventing a defect such as a failure of only one of the claw portions 744 to dig, for example, when the antenna device 1 is attached to the roof R1.

The protrusions 747 are paired protrusions extending in the +x direction and the −x direction of each of the legs 741, and are fitted in and fixed to slits (not shown) formed in the antenna base 20. The protrusions 747 fixed by the slits in the antenna base 20 prevent the movable leg portions 74 from spreading beyond the positions defined by the slits when the antenna attachment 60 is attached to the antenna main body M1. The connecting portion 748 is a substantially triangular connecting portion that connects the protrusion 747 to the leg 741.

The cylindrical portion 83 of the male screw part 80 is an unthreaded shaft portion located between the thread portion 84 and the head portion 85. The thread portion 84 is a shaft portion located on the −z direction side of the male screw part 80, having threads by being threaded with a male screw, and extending in the −z direction.

The head portion 85 is a head portion of the male screw part 80 located on the +z direction side of the male screw part 80 to be rotated with a bolt tool held by an operator, and includes a substantially hexagonal column portion on the +z direction side and a substantially circular plate portion on the −z direction side.

As shown in FIG. 4, assume that the cross section (the x-y plane) of the hole 721 has a diameter $\phi 1$, and the cross section (the x-y plane) of the hole 722 has a diameter $\phi 2$. As shown in FIG. 5, assume that the cross section (the x-y plane) of the cylindrical portion 83 orthogonal to the axial direction (the z-axis direction) has a diameter $\phi 3$, the cross section (the x-y plane) of the thread portion 84 orthogonal to the axial direction (the z-axis direction) has a diameter $\phi 4$, and the cross section (the x-y plane) of the substantially circular plate portion of the head portion 85 orthogonal to the axial direction (the z-axis direction) has a diameter $\phi 5$. Herein, the diameter $\phi 1$ of the hole 721 has a relation of Expression (1) below.

$$\phi 3<\phi 1<\phi 4 \qquad (1)$$

The diameter $\phi 2$ of the hole 722 has a relation of Expression (2) below.

$$\phi 4<\phi 2<\phi 5 \qquad (2)$$

According to Expressions (1) and (2), the cylindrical portion 83 is allowed to be passed through the hole 721 and the hole 722 without contact. The thread portion 84 is allowed to be passed through the hole 722 without contact, but is not passed through the hole 721. The head portion 85 is not passed through the hole 721 or the hole 722. The hole portion 72 has a shape that allows the cylindrical portion 83 having been passed through the hole 722 to be slid into the hole 721. Therefore, in the male screw part 80, the cylindrical portion 83 is slidable into the hole 721 in the +x direction after the thread portion 84 is passed through the hole 722 and the cylindrical portion 83 is also passed through the hole 722. The thread portion 84 does not fall out of the hole 721 in the −z direction after sliding.

Figure 6C:
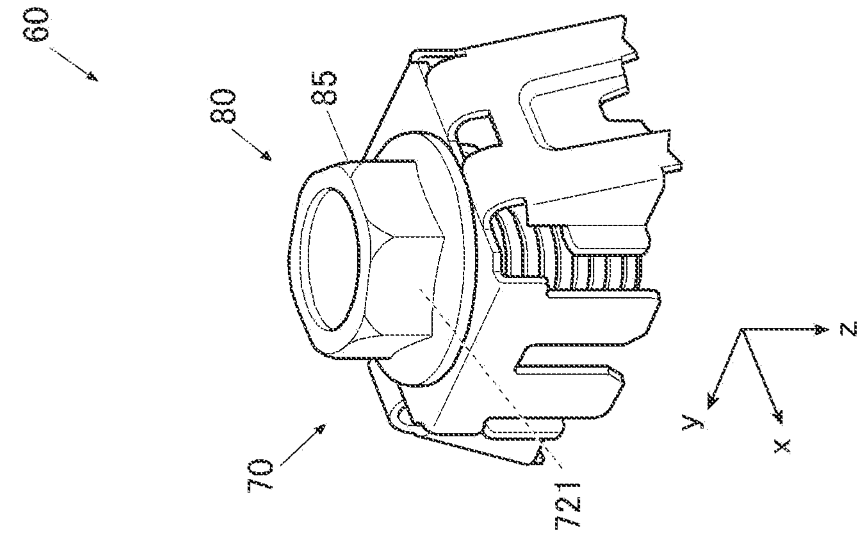
FIG. 6C is a perspective view showing the antenna attachment in a state after the cylindrical portion is slid into a first hole.
Figure 6B:
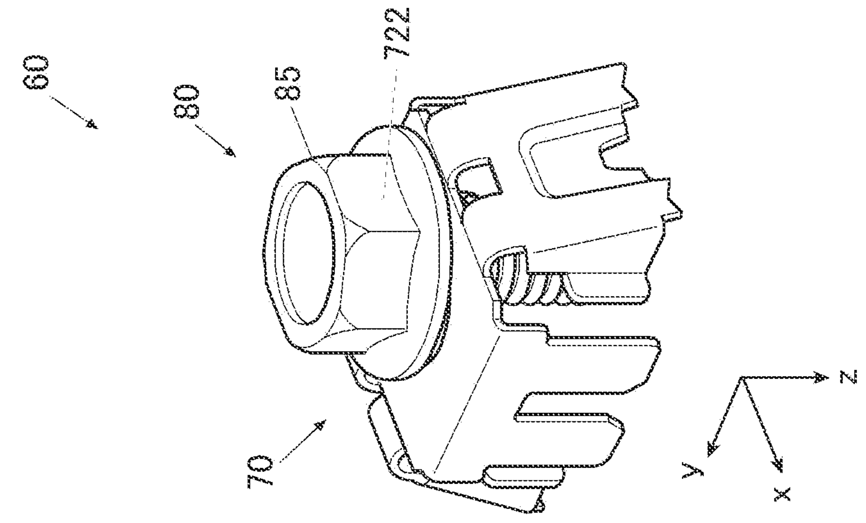
FIG. 6B is a perspective view showing the antenna attachment in a state after the thread portion and a cylindrical portion are passed through the second hole.
Figure 6A:
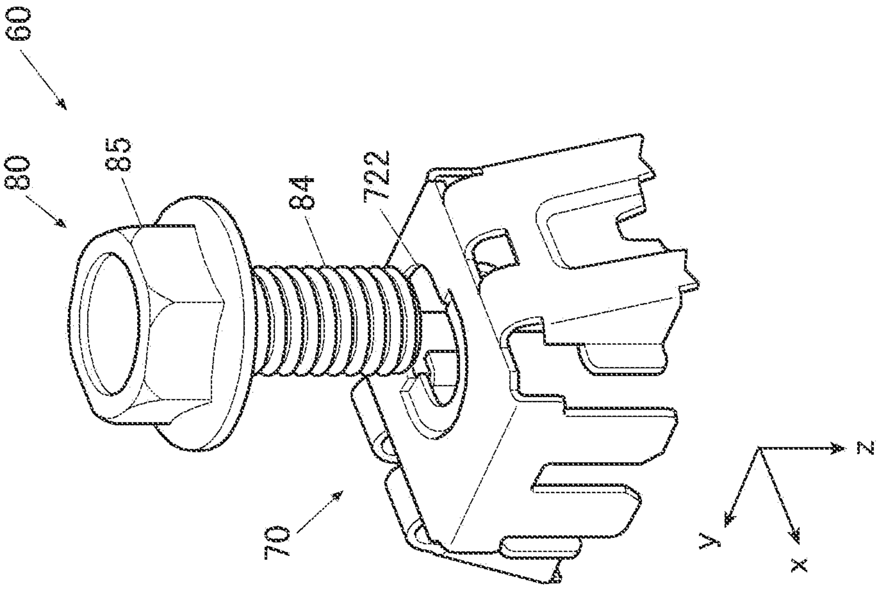
FIG. 6A is a perspective view of the antenna attachment in a state before a thread portion is passed through a second hole.
Figure 7A:
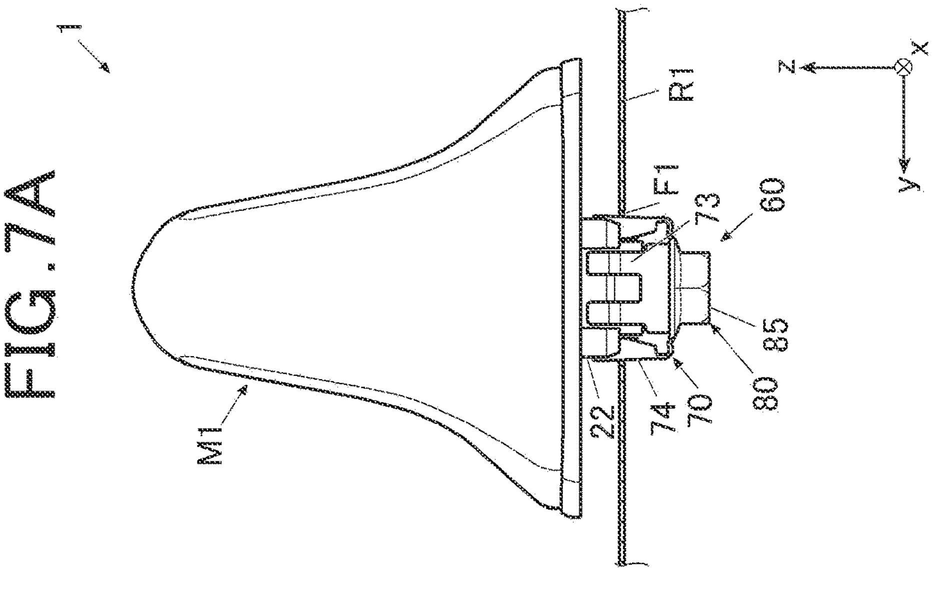
FIG. 7A is a side view of the antenna device in a temporarily fastened state while the antenna attachment is being passed through the fixing opening.
Figure 7B:
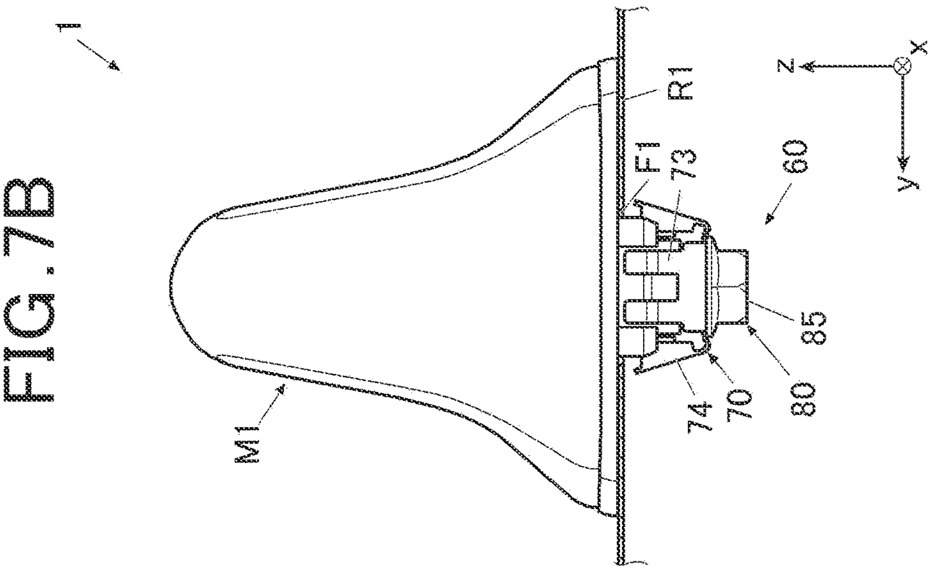
FIG. 7B is a side view of the antenna device in the temporarily fastened state after the antenna attachment is passed through the fixing opening.
Figure 7C:
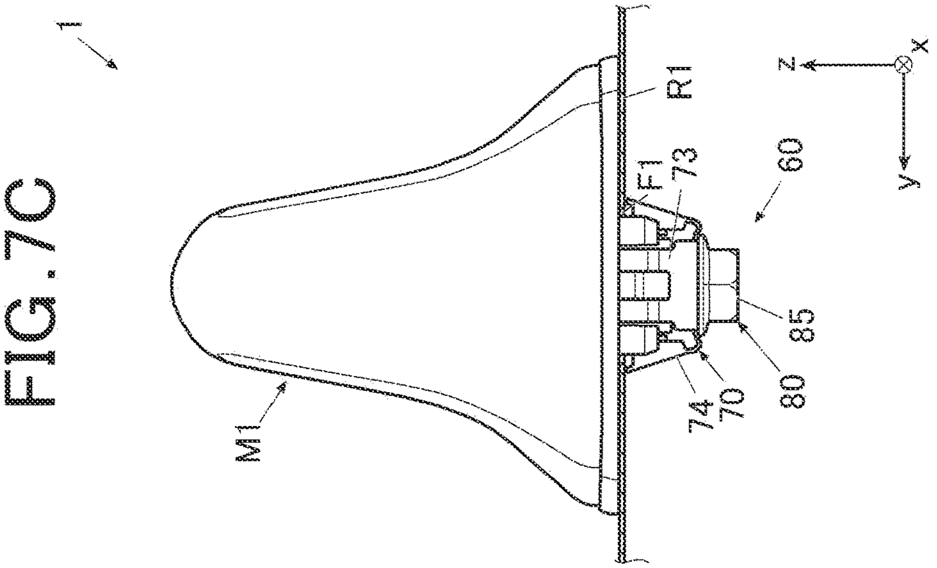
FIG. 7C is a side view of the antenna device in an attached state after the male screw part is tightened.

Next, a method for attaching the antenna device 1 to the fixing opening F1 in the roof R1 of the vehicle will be described with reference to FIG. 6A to FIG. 7C. FIG. 6A is a perspective view of the antenna attachment 60 in a state before the thread portion 84 is passed through the hole 722. FIG. 6B is a perspective view of the antenna attachment 60 in a state after the thread portion 84 and the cylindrical portion 83 are passed through the hole 722. FIG. 6C is a perspective view of the antenna attachment 60 in a state after the cylindrical portion 83 is slid into the hole 721. FIG. 7A is a side view of the antenna device 1 in a temporarily fastened state while the antenna attachment 60 is being passed through the fixing opening F1. FIG. 7B is a side view of the antenna device 1 in the temporarily fastened state after the antenna attachment 60 is passed through the fixing opening F1. FIG. 7C is a side view of the antenna device 1 in an attached state after the male screw part 80 is tightened.

An operation process until the antenna device 1 is attached to the fixing opening F1 in the installation surface of the roof R1 of the vehicle is performed by respective steps of: (P1) assembling the antenna main body M1 excluding the antenna cover 10 and the pad 52 of the antenna device 1; (P2) assembling the antenna attachment 60; (P3) attaching (temporarily fastening) the antenna attachment 60 to the antenna main body M1; (P4) attaching the antenna cover 10 and the pad 52 to the antenna main body M1; (P5) attaching the antenna device 1 to the fixing opening F1; and (P6) tightening the antenna attachment 60. Each of the steps will be described sequentially.

Assembling of the antenna main body M1 excluding the antenna cover 10 and the pad 52 in step P1 and assembling of the antenna attachment 60 in step P2 will be described. An operator performs assembling of the antenna main body M1 and assembling of the antenna attachment 60. Assembling of the antenna main body M1 excluding the antenna cover 10 and the pad 52 is similar to that in conventional cases, and description is omitted. For assembling the antenna attachment 60, the operator first prepares the legged washer 70 and the male screw part 80 as shown in FIG. 3. The screw locking agent shall be applied to the thread portion 84 of the male screw part 80 and solidified in advance.

As shown in FIG. 6A, the operator then locates the thread portion 84 of the male screw part 80 above the hole 722 of the legged washer 70 (on the −z direction side).

As shown in FIG. 6B, the operator then moves the thread portion 84 and the cylindrical portion 83 in the +z direction for insertion into the hole 722. Even when the thread portion 84 having the diameter ϕ4 is inserted into the hole 722, contact of the thread portion 84 with the hole 722 is reduced and separation of the screw locking agent from the thread portion 84 is also reduced because the diameter ϕ2 of the hole 722 has the relation of Expression (2). The cylindrical portion 83 is then inserted into the hole 722, and the head portion 85 is stopped in contact with the flat plate portion 71. In other words, the cylindrical portion 83 and the flat plate portion 71 are made level with each other (located at the same position in the z-axis direction).

As shown in FIG. 6C, the operator then slides the cylindrical portion 83 of the male screw part 80 from the hole 722 into the hole 721 in the +x direction to complete assembling of the antenna attachment 60 (emplacement of the male screw part 80 at the legged washer 70). The relation of the diameter ϕ1 of the hole 721 in Expression (1) and the shape of the hole portion 72 enable the cylindrical portion 83 to be slid into the hole 721. Absence of threads on the cylindrical portion 83 reduces contact with the inner periphery of the hole 721 and enables easy sliding. In addition, even if the operator pulls, in the −z direction, the male screw part 80 in the antenna attachment 60 with the male screw part 80 having been slid or orients the antenna attachment 60 such that the −z direction becomes the direction of gravitational force, the male screw part 80 is not detached from the antenna attachment 60 (the legged washer 70) because the diameter ϕ4 of the thread portion 84 is larger than the diameter ϕ1 of the hole 721 in accordance with Expression (1).

Attaching (temporary fastening) of the antenna attachment 60 to the antenna main body M1 in step P3 will now be described. The operator screws the male screw part 80 of the antenna attachment 60 having been assembled with the female screw portion 221 of the antenna base 20 of the antenna main body M1 having been assembled by a predetermined amount, thereby bringing the antenna device 1 into the temporarily fastened state. The predetermined amount to be screwed is such an amount that the antenna attachment 60 is not detached from the antenna main body M1 and the antenna attachment 60 is emplaced at but not fixed to the antenna base 20. The male screw part 80 is screwed (rotated) without the cylindrical portion 83 being caught by the hole 721 because the diameter ϕ3 of the cylindrical portion 83 is smaller than the diameter ϕ1 of the hole 721 in accordance with Expression (1). Attaching of the antenna cover 10 and the pad 52 to the antenna main body M1 excluding the antenna cover 10 and the pad 52 in step P4 is similar to that in conventional cases, and description is omitted.

Attaching of the antenna device 1 in the temporarily fastened state to the fixing opening F1 in step P5 will now be described. As shown in FIG. 2, the operator first locates the antenna device 1 in the temporarily fastened state above the fixing opening F1 in the installation surface of the roof R1 of the vehicle (on the +z direction side).

As shown in FIG. 7A, the operator then moves the movable leg portions 74 of the antenna device 1 in the temporarily fastened state in the −z direction. At this time, the movable leg portions 74 are pressed down against the inner periphery of the fixing opening F1 to be brought into a closed state. The operator inserts the antenna attachment 60 with the movable leg portions 74 closed through the fixing opening F1.

Then, as shown in FIG. 7B, the pressure imposed on the movable leg portions 74 is released after the antenna attachment 60 is passed through the fixing opening F1, leading to a released state in which the movable leg portions 74 spread. Even if the operator pulls the antenna device 1 in the +z direction in this released state, the movable leg portions 74 having spread are caught by the roof R1 and do not fall out.

Tightening of the antenna attachment 60 in step P6 will now be described. As shown in FIG. 7C, the operator tightens the antenna device 1 with the movable leg portions 74 inserted through the fixing opening F1 being in the released state by retightening the male screw part 80 with an impact driver or the like, and terminates attaching of the antenna device 1 to the fixing opening F1. The slits 732 and the protrusions 747 of the legged washer 70 enable the antenna device 1 to be fixed to an attaching target position of the roof R1 without rotating the legged washer 70, thereby tightening the male screw part 80.

According to the present embodiment as described above, the antenna attachment 60 includes the male screw part 80 to be screwed with the antenna main body M1 of the antenna device 1 to be installed in the fixing opening F1 in the roof R1 of the vehicle and having the head portion 85 and the thread portion 84, and the cylindrical portion 83 provided between the head portion 85 and the thread portion 84 and having a cross section smaller than the cross sections of the head portion 85 and the thread portion 84 (the diameter $\phi 3<$the diameters $\phi 4$, $\phi 5$) and the legged washer 70 having the hole portion 72 that allows passage of part of the male screw part 80. The hole portion 72 has a shape in which the holes 721 and 722 having sizes different from each other are overlapped. The hole 721 has a shape that does not allow passage of the head portion 85 and the thread portion 84 and allows passage of the cylindrical portion 83. The hole 722 has a shape that does not allow passage of the head portion 85 and allows passage of the thread portion 84 and the cylindrical portion 83. The hole portion 72 has a shape that allows the male screw part 80 to be slid into the hole 721 in a state where the cylindrical portion 83 has been inserted into the hole 722.

Therefore, a simple operation of the operator to insert the male screw part 80 into the hole 722 and slide the male screw part 80 into the hole 721 prevents the male screw part 80 from falling out of the antenna attachment 60 and enables the axial direction of the male screw part 80 to match the axial direction (the z-axis direction) of the female screw portion 221 at the time of sliding. This prevents the male screw part 80 from being caught obliquely and improves operability in the step of assembling the antenna attachment 60. This reduces a risk for the necessity to dispose of a component such as the antenna attachment 60 (in the worst case, a product of the antenna device 1) when unintended emplacement such as oblique catching occurs. Separation of the screw locking agent applied to the thread portion 84 is also reduced because the thread portion 84 is passed through the hole 722 (having the diameter $\phi 4<\phi 2$) and the cylindrical portion 83 of the male screw part 80 may come into contact with the inner periphery of the hole portion 72 when the male screw part 80 is slid.

Further, absence of the possibility that the legged washer 70 and the male screw part 80 may bite each other unlike the conventional fixing structure improves operability in a detaching step in a case where the operator detaches the antenna device 1 from the roof R1 of the vehicle or replaces the antenna device 1.

The holes 721 and 722 have circular shapes. This allows the male screw part 80 to be passed appropriately through the holes 721 and 722, and increases the strength of the legged washer 70.

The intermediate portion provided between the head portion 85 and the thread portion 84 is the cylindrical portion 83. This enables the male screw part 80 to be slid easily into the hole 721 in the state where the cylindrical portion 83 has been inserted in the hole 722.

The legged washer 70 has the fixed leg portions 73 and the movable leg portions 74 that sandwich the roof R1 between the antenna main body M1 and the antenna attachment 60 with the male screw part 80 being screwed after the antenna attachment 60 is inserted into the fixing opening F1 in the roof R1 of the vehicle in the state where the antenna attachment 60 has been fastened temporarily to the antenna main body M1. This enables the antenna device 1 to be attached easily to the roof R1 of the vehicle.

The antenna device 1 includes the antenna attachment 60 and the antenna main body M1. Therefore, the antenna device 1 that prevents the male screw part 80 from falling out of and being caught obliquely in the antenna attachment 60, improves operability in the assembling step and detaching step of the antenna attachment 60, and reduces separation of the screw locking agent applied to the thread portion 84 is configured.

The description in the above-described embodiment is an example of the antenna attachment and antenna device according to the present invention, and is not limited to this example.

For example, in the legged washer 70 of the above-described embodiment, the hole portion 72 is obtained by overlapping the two circular holes having the same shape with different diameters as the cross-sectional sizes, but is not limited to this example. The overlapped holes constituting the hole portion of the legged washer may have another shape such as rectangle or triangle. Alternatively, the overlapped holes may have shapes of different types from each other (for example, the hole portion obtained by overlapping a square hole having large sides and a circular hole having a small diameter).

Although in the legged washer 70 of the above-described embodiment, the central point of the hole 721 of the hole portion 72 having the smaller diameter $\phi 1$ is located at the central point of the flat plate portion 71, this is not a limitative example. For example, the central point of the hole 722 having the larger diameter $\phi 2$ may be located at the central point of the flat plate portion 71. In this manner, the smaller hole may be located at any position in the flat plate portion 71 when the antenna device 1 is attached.

Although the antenna device 1 of the above-described embodiment is attached to the roof R1 of the vehicle, this is not a limitative example. The antenna device 1 may be attached to another place of a moving body such as a vehicle. For example, the antenna device 1 may be attached to part of a bumper of a vehicle or a lower frame of a roof (on the inner side of the vehicle).

Detailed configuration and detailed operation of the antenna device 1 in the above-described embodiment may also be modified as appropriate without departing from the scope of the present invention.

The invention claimed is:

1. An antenna attachment comprising:

a male screw part to be screwed with an antenna main body of an antenna device to be installed on a moving body, the male screw part including a head portion and a thread portion, and an intermediate portion that is provided between the head portion and the thread portion and has a cross section smaller than cross sections of the head portion and the thread portion; and a washer including a hole portion that allows passage of part of the male screw part, wherein:

the hole portion has a shape in which a portion of each of a first hole and a second hole having sizes different from each other is overlapped on a same plane, the first hole has a shape that does not allow passage of the head portion and the thread portion and allows passage of the intermediate portion, and the second hole has a shape that does not allow passage of the head portion and allows passage of the thread portion and the intermediate portion.

2. The antenna attachment according to claim 1, wherein the hole portion has a shape that allows the male screw part to be slid into the first hole in a state where the intermediate portion has been inserted in the second hole.

3. The antenna attachment according to claim 1, wherein at least one of the first hole and the second hole has a circular shape.

4. The antenna attachment according to claim 1, wherein the intermediate portion is a cylindrical portion.

5. The antenna attachment according to claim 1, wherein the first hole is located at a position corresponding to a female screw portion of the antenna main body.

6. The antenna attachment according to claim 1, wherein the washer has a leg portion that sandwiches an installation target of the moving body between the antenna main body and the antenna attachment with the male screw part being screwed after the antenna attachment is inserted into a fixing opening in the installation target in a state where the antenna attachment has been fastened temporarily to the antenna main body.

7. An antenna device comprising:

the antenna attachment according to claim 1; and the antenna main body.

* * * * *